S. SANDHOLDT.
Tap and Faucet.
No. 214,845.   Patented April 29, 1879.
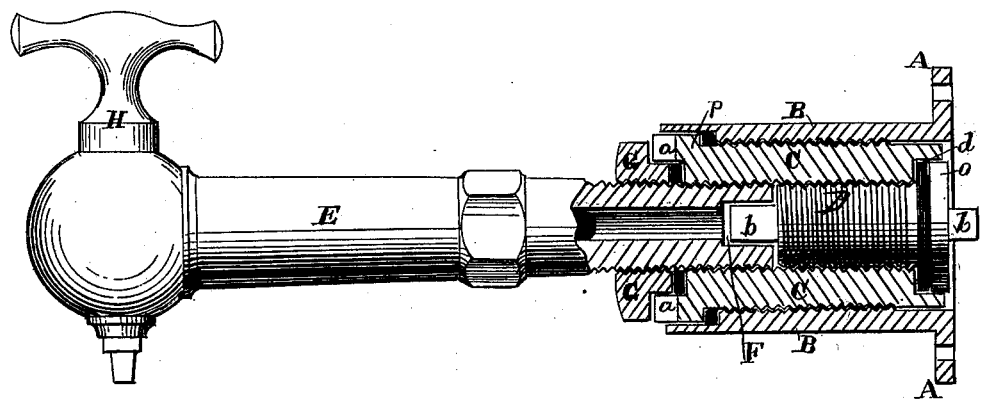
Witnesses
Geo. H. Strong.
Frank A. Brooks
Inventor
Samuel Sandholdt
By Dewey & Co.
Atty.

UNITED STATES PATENT OFFICE.

SAMUEL SANDHOLDT, OF CENTREVILLE, CALIFORNIA.

IMPROVEMENT IN TAPS AND FAUCETS.

Specification forming part of Letters Patent No. 214,845, dated April 29, 1879; application filed December 28, 1878.

*To all whom it may concern:*

Be it known that I, SAMUEL SANDHOLDT, of Centreville, county of Alameda, and State of California, have invented an Improved Tap and Faucet for Barrels; and I hereby declare the following to be a full, clear, and exact description thereof, reference being had to the accompanying drawing.

My invention relates to that class of taps and faucets for barrels in which a faucet is screwed into a permanent bushing in the barrel; and it consists in a novel construction of a bushing having a smooth exterior surface, adapting it to be driven into the opening in the head of the barrel or cask, said bushing being provided with a flange which screws to fasten the whole permanently in place from the interior of the head. In combination with this bushing, which has screw-threads formed on the inside, I employ a removable threaded sleeve, which also has interior screw-threads adapted to receive a solid plug, said plug being operated by the inner end of the faucet, so that when the latter is screwed into the thimble it will force the plug into the barrel and leave a free opening for the escape of the liquid. The thimble has a flange or shoulder with a washer upon its outer end, whereby the thimble makes a tight joint in the bushing. Within the thimble at each end is formed a seat, and the screw-plug at the inner end and a screw-collar upon the faucet at the opposite end are fitted with shoulders or flanges and washers and set up against these seats to prevent leakage, as will be more fully described by referring to the accompanying drawing, in which the figure is a sectional view of my device.

Many attempts have been made to substitute a permanent tap for the small spruce plugs which are usually employed to stop the faucet-hole when a barrel is refilled with beer, and for this purpose hollow screw-plugs have been fitted into a screw-bushing, these plugs having valves, and being operated by the action of screwing in the faucet. The holes in these plugs being necessarily small are often stopped by sediment or pieces of hop-leaves, and as they cannot be removed it is impossible to clean them perfectly, while the screw-bushing will become loose in time and leak.

My invention is designed, first, to provide a perfectly-tight bushing, which may be permanently secured within the head; and, secondly, a solid plug, which shall imitate the ordinary wooden plug in that it is entirely removed from the bushing, leaving a clear opening through the faucet, and allowing the barrel to be easily cleaned when empty.

Let A represent a metal flange or disk having screw-holes in it, as shown, and by which it may be screwed onto the inside of the head of a barrel. Forming part of this plate or disk is a hollow internally-threaded projecting sleeve, B, which is driven through the head of the barrel from the inside, and held in place by the disk, of which it forms part, being screwed to the inner side of the head. The inside of this projecting sleeve has threads formed in it, and an internally and externally threaded bushing, C, corresponding in length to the sleeve is screwed into it. This bushing or thimble is countersunk at each end, as shown, so that a tight joint is formed, as hereinafter described.

The outer edge of the bushing C is formed with a flange or shoulder, $p$, having a washer against it, so that when the bushing is screwed into the sleeve B, this shoulder comes against the seat formed in said sleeve, and a tight joint is thus made. In the flange $p$ are cut notches $a$, by means of which a wrench may be applied, so as to remove it from the sleeve when necessary.

Into this bushing C fits a plug or tap, D, having screw-threads formed on it, as shown. At each end of this plug is a square head, $b$, by means of which it is screwed into or out of place, as hereinafter described, and at one end is the flange or shoulder $o$, having a washer, $d$, so that when the plug is screwed into place in the bushing the washer and shoulder or flange fit close into the countersunk portion of the sleeve on the inner side, and thus form a tight joint.

The faucet E has threads formed on it to correspond with those on the interior of the bushing C, and at its end is a recess, F, formed of suitable size and shape to fit over the square head $b$ of the tap.

On the faucet E is screwed a nut and washer, G, which may be screwed down the faucet and fit against the countersunk portion of the bushing to make a tight joint, as hereinafter described.

The sleeve is attached to the barrel by means of the plate or disk A, as described, said disk being on the inside.

In order to insert the plug, the bushing C is taken out of the sleeve and the plug is screwed into this bushing until the flange and washer fit snug into the countersunk inner end of said bushing. The bushing is then screwed back into the sleeve by means of the notches $a$ on its edge until the shoulder B with its washer fits into the seat in the sleeve, the flanged edge of the plug in said bushing being on the inside and the shoulders $p$ of the bushing on the outside. The barrel is then tight, and the contents cannot escape.

When it is desired to draw any liquor from the barrel, the faucet is placed in a position so that the recess in its end will fit over the outer square head of the tap. The faucet is then screwed in a short distance, when the nut and washer on said faucet are screwed down so as to fit tight against the outer countersunk end of the bushing, making a tight joint at that place. The faucet is then screwed farther into the bushing, gradually unscrewing the tap as it enters, until the faucet takes the place of the tap and the tap falls into the barrel.

An opening is formed lengthwise in the faucet, communicating with the recess F, so that as soon as the tap falls into the barrel the liquor may be drawn off through the faucet, the valve H regulating the flow.

When the barrel is empty and being cleaned the tap may be removed through the bunghole, or the bushing may be removed and the tap taken out through the sleeve into which the bushing screws.

By this means I provide a tap and faucet which has no spring to get out of order, and which is simple in construction. No injurious pounding is necessary to insert it in the barrel, and any one may tap a barrel of beer without danger of any loss of contents by its spurting out just as the faucet is being inserted.

The joints are kept tight by the flange and washer on the inner end of the tap and by the nut and washer on the faucet, so that no leakage can occur by the insertion of the faucet and displacement of the tap or plug.

Having thus described my invention, what I claim as new, and desire to secure by Letters Patent, is—

1. A metallic bushing to receive the faucet, consisting of the sleeve B, having a smooth exterior surface, and provided with the flange A, fitted to be secured to the interior of the cask, substantially as and for the purpose herein described.

2. The metallic bushing B, with its flange A, said bushing being provided with interior screw-threads, in combination with the removable bushing or thimble C, provided with exterior and interior screw-threads, and fitted to receive the screw-plug D, said plug being removed from the thimble by the action of the faucet, so as to leave a clear opening, substantially as herein described.

3. The interior removable thimble C, screwed into the exterior permanent bushing B, said thimble being fitted to receive the screw-plug D, and having the countersunk depression or seat at each end to receive the head of the plug and the faucet-collar and form a tight joint, substantially as herein described.

4. The exterior permanent bushing B, having the interior removable thimble C, fitted to receive the screw-plug D, in combination with the faucet E, with its collar G and washer, said collar and screw-plug being seated at opposite ends of the thimble, so as to form a tight joint, substantially as herein described.

In witness whereof I have hereunto set my hand.

SAMUEL SANDHOLDT.

Witnesses:
GEO. H. STRONG,
FRANK A. BROOKS.